Nov. 23, 1926.
A. N. McGRAY
1,607,767
HATCH AND COVER
Filed Dec. 15, 1925    3 Sheets-Sheet 1
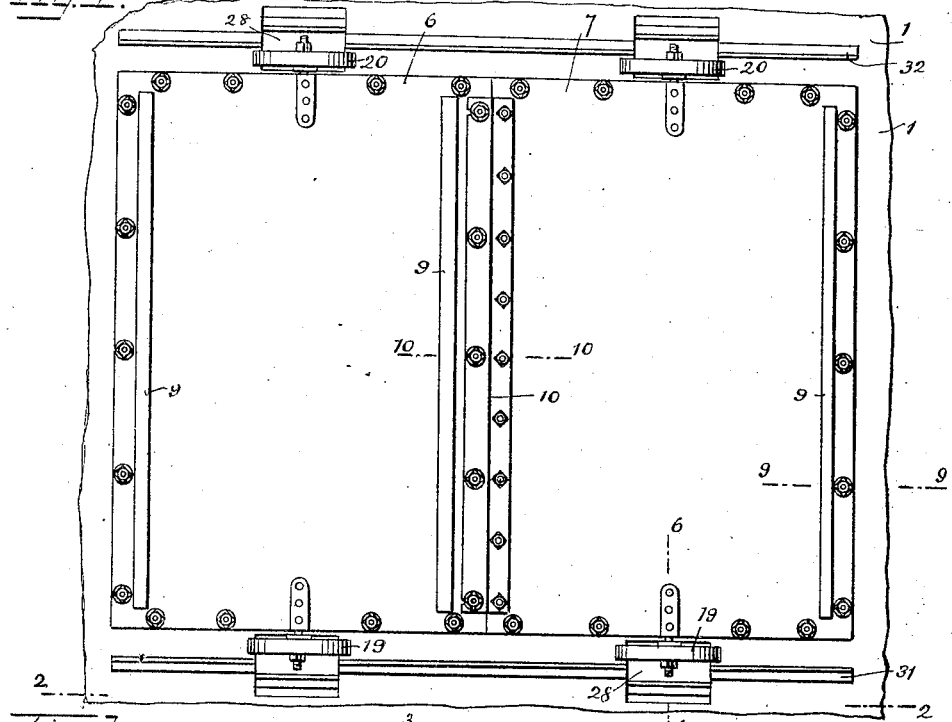
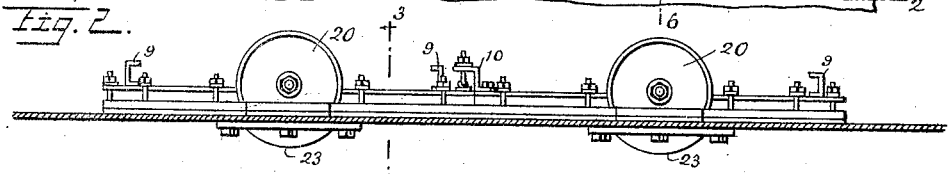
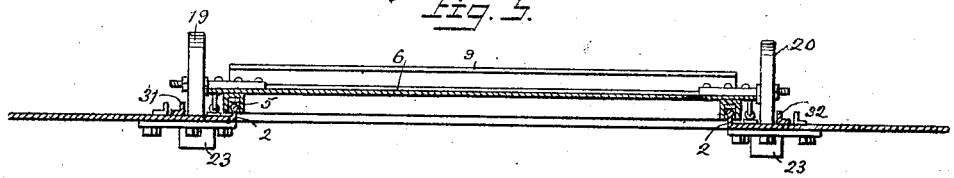
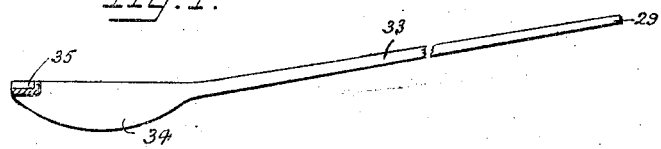
WITNESSES
H. J. Walker
A. L. Kitchin
INVENTOR
Arthur N. McGray
BY
ATTORNEYS Nov. 23, 1926.
A. N. McGRAY
1,607,767
HATCH AND COVER
Filed Dec. 15, 1925   3 Sheets-Sheet 2
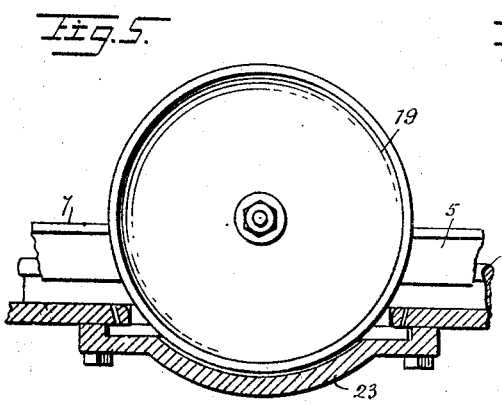
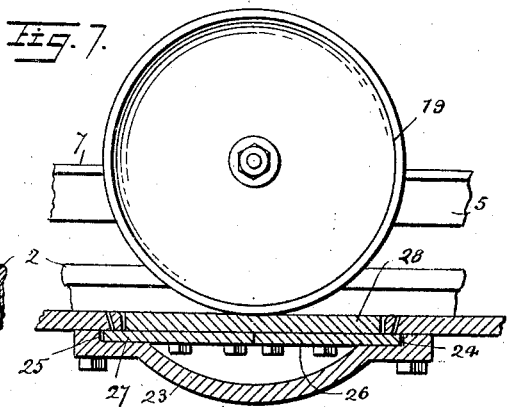
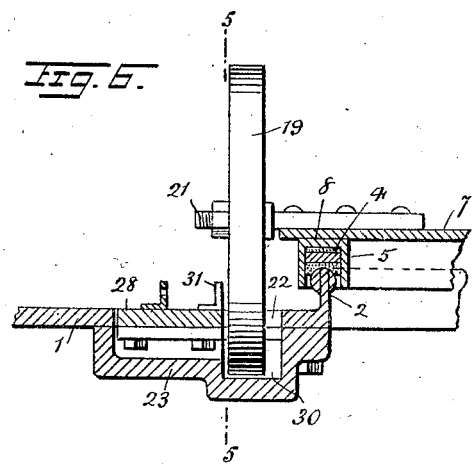
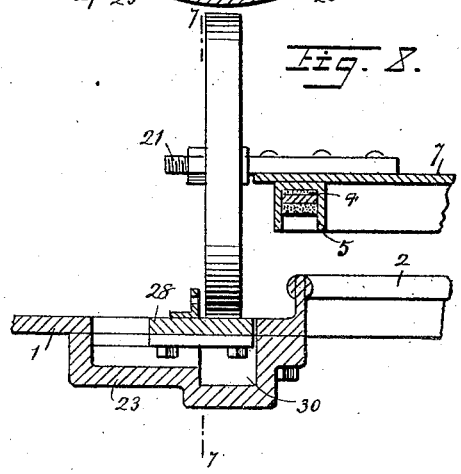
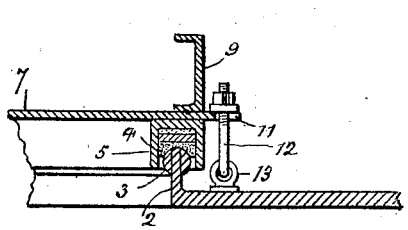
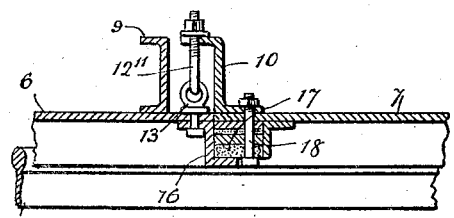
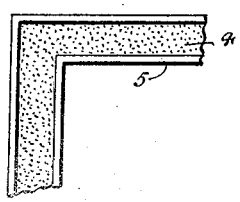
WITNESSES
H. T. Walker
A. L. Kitchin
INVENTOR
Arthur N. McGray
BY
ATTORNEYS Nov. 23, 1926.  1,607,767
A. N. McGRAY
HATCH AND COVER
Filed Dec. 15, 1925  3 Sheets-Sheet 3
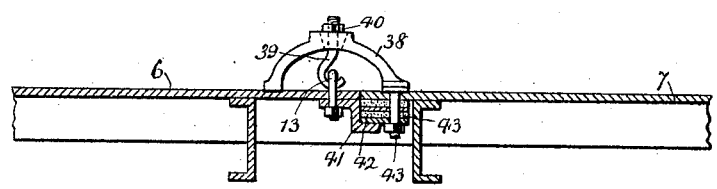
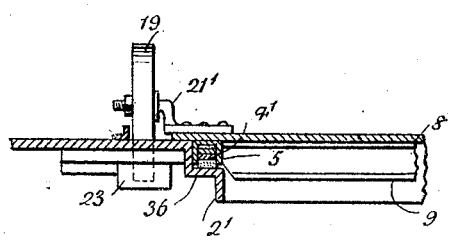
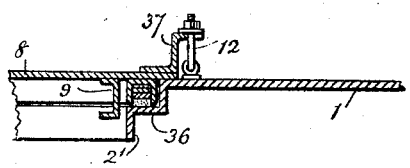
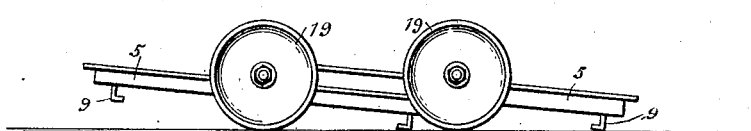
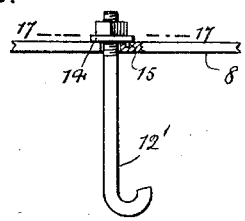
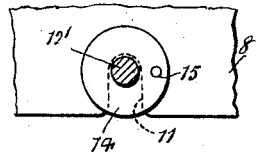
WITNESSES
H. T. Walker
A. L. Kitchin
INVENTOR
Arthur N. McGray
BY
ATTORNEYS Patented Nov. 23, 1926.

1,607,767

UNITED STATES PATENT OFFICE.

ARTHUR N. McGRAY, OF HUNTINGTON, MASSACHUSETTS.

HATCH AND COVER.

Application filed December 15, 1925. Serial No. 75,608.

This invention relates to hatches and particularly to a specially formed hatch and cover for ships and has for an object to provide an improved construction over my prior Patents, No. 934,456, issued September 21, 1909, and No. 1,158,946, issued November 2, 1915.

Another object of the invention is to make a stronger and more simple structure which may be readily applied and removed and which may be adapted to the different kinds of coamings now in common use.

A further object of the invention is to provide a simplified and strong hatch cover structure which is supplied with a pair of supporting wheels and with associated structures so arranged that the cover may be readily trundled toward and from the hatch opening, stored in a minimum space when not in use and when in use clamped firmly in place over the coaming without interference by the wheels.

A still further object of the invention is to provide a steel hatch cover having adequate strength to resist the downward pressure of cargo piled thereon as well as to resist pressure from below in case of stranding and large leaks developing in consequence thereof while at the same time accommodating itself to a low coaming and to quick and easy shifting into position, and also to an unoccupied space for temporary storage.

An additional object is to provide a hatch cover which will efficiently co-operate with hatch coamings when projecting slightly or not at all above the level of the upper or various decks or even below the level of the decks and at the same time presenting sufficient stiffening and reinforcing members to withstand strain in either an upward or downward direction as well as to present a fireproof and waterproof connection between the cover and the coaming.

In the accompanying drawings—

Figure 1 is a top plan view of part of the deck with a hatch disclosing the invention arranged thereon and including a pair of covers.

Figure 2 is a sectional view through Figure 1, approximately on line 2—2.

Figure 3 is a transverse sectional view through Figure 2 on line 3—3.

Figure 4 is a side view of a cam lever used in raising the covers when removing.

Figure 5 is a sectional view through Figure 6, approximately on line 5—5.

Figure 6 is a fragmentary sectional view through Figure 1 on line 6—6.

Figure 7 is a view similar to Figure 5 showing a sliding block in position for supporting the cover roller.

Figure 8 is a sectional view similar to Figure 6 but showing the block moved over to the position illustrated in Figure 7.

Figure 9 is an enlarged fragmentary sectional view through Figure 1, approximately on line 9—9.

Figure 10 is an enlarged fragmentary sectional view through Figure 1, approximately on line 10—10.

Figure 11 is a fragmentary inverted view of one corner of the channel iron and packing connected to the lower face of the cover.

Figure 12 is a fragmentary view similar to Figure 10 but showing a modified arrangement of connecting two covers together when the reinforcing members are on the under surface of the covers.

Figure 13 is a fragmentary sectional view similar to the left hand side of Figure 3 but showing a modified form of the invention applied to a depressed or negative coaming.

Figure 14 is a view similar to Figure 9 but showing the modified coaming and cover disclosed in Figure 13.

Figure 15 is a reduced side view of two covers showing how they may be nested when not in use.

Figure 16 is a fragmentary view partly in section showing how the washers on the hooks or stay bolts are held against accidental removal.

Figure 17 is an enlarged sectional view through Figure 16, approximately on line 17—17.

Referring to the accompanying drawings by numerals, 1 indicates a deck which may be the top deck or any of the lower decks, said deck being provided with a coaming 2 shown more particularly in Figure 9. This coaming is provided with an enlarged upper end 3 so as to readily sink into the packing structure 4 carried by the channel iron 5. The packing structure 4 may be any desired material, as for instance, fiber, rubber or other desired packing material which will make a waterproof and fireproof connection when the respective covers 6 and 7 are in operative position. These covers are identical except for the central connection as shown in section in Figure 10 and, therefore, the description of one will apply to both. It is, of course, evident that the invention could apply to a single cover as well as to a double cover structure as illustrated in Figure 1 or to a greater number of covers.

The cover 7 is preferably made of suitable metal, a channel iron 5 extending around the perimeter of the body 8 on the lower surface and with stiffening and reinforcing members 9 and 10 on the upper surface. The reinforcing member 9 is preferably a channel member while the reinforcing member 10 is a Z bar as illustrated in Figure 10. Where a single cover is used, the Z bar 10 is eliminated and an ordinary reinforcing bar 9 used. Preferably, the body 8 extends beyond the reinforcing member 9 and is provided with a number of notches 11 for accommodating stay bolts 12 which are connected to the deck in any suitable manner, as for instance, by an ordinary eye member 13. If desired, instead of using an ordinary stay bolt 12, a hook 12' might be used as shown in Figure 16. This will permit a quicker fastening and unfastening of the clamping members and also will permit the hooks 12' to be removed and leave the deck that much clearer. In both forms of clamping members, there is provided a washer 14 which is supplied with a pin 15 extending into a suitable notch or aperture in the body 8 whereby the stay bolt cannot be accidentally knocked out of its notch 11. Where a single cover is used, the channel iron 5 extends around the perimeter of the cover on the lower surface but where two or more covers are used as shown in Figure 1 this member is eliminated at the point of contact between the two covers and the structure shown in Figures 1 and 10 substituted.

From Figure 10 it will be observed that the connection between the two covers includes the Z bar 10 and the stay bolt 12" similar to stay bolt 12. In addition, the eye member 13 clamps in place a Z bar 16 which is adapted to be pressed against the packing 17 held in place by the respective bolts 18 which also hold the Z bar 10 in place on the cover 7. By the use of the bolts 12, the covers are firmly connected together and also firmly connected to the deck while at the same time the various packings 4 and 17 provide a watertight and fireproof structure. Also, the reinforcing members and the channel members 9 act to so stiffen and reinforce the body 8 as to withstand properly heavy seas washing over the ship in the case of the top hatch and to also withstand the pressure of cargo piled on the various covers of the lower hatches. In fact, the reinforcing members are so distributed that they will stiffen and reinforce the covers against pressure in either direction and as the covers are made from metal, they will act as fire resisting members in addition to means for supporting cargo.

In order to readily and easily move the covers over the hatchway or remove them therefrom, a special construction has been provided shown particularly in Figures 1 to 8 wherein wheels 19 and 20 are provided for each of the covers. As these wheels are identical, the description of one will apply to both. Preferably these wheels are arranged centrally of each end of the covers so that they are readily balanced thereon. An axle 21 is provided for the wheel 19 as shown in Figure 6, said axle being riveted or otherwise secured to the body 8 of cover 7. The diameters of the wheels 19 and 20 are such that when the cover is on the smooth deck, the cover will be supported above the deck sufficiently to be readily moved over the coaming 2. After the same has been moved over the coaming 2, it is then necessary to lower the same and to permit this without removing the wheels, an aperture 22 is provided for each wheel in the deck 1. In order to close this aperture and yet permit the wheel to drop down, an interior covering structure 23 is provided which is preferably a casting forming a socket in which the wheel may rest, said casting being bolted or otherwise rigidly secured to the underside of the deck.

In constructing the casting 23, it is preferably formed so that there are provided slideways 24 and 25 as shown in Figure 7, said slideways accommodating the plates 26 and 27, said plates being bolted or otherwise secured to a plate 28 which acts to restore the deck 1 and which may be moved from the position shown in Figure 6 to the position shown in Figure 8 or in a reverse direction. When the covers are first being placed in position, the plate 28 is positioned as shown in Figure 8 and the cover rolled over to its correct position. The cover is then raised slightly by any suitable means, as for instance, the lever 29. After this has been done, the plate 28 is shifted to the position shown in Figure 6 and then the lever or levers 29 are actuated for lowering the cover until it assumes the position shown in Figure 6. Preferably the socket 30 in casting 23 is sufficiently deep to permit the wheel 19 to be suspended in the air while the packing 4 firmly presses against the enlargement 3 of coaming 2. On each side of the hatchway is arranged angle bars 31 and 32 extending athwart a ship and riveted or bolted to the deck so as to reinforce the deck at this point. These angle bars also act as guideways for the wheels 19 and 20 as the cover is being moved over the hatchways. Preferably a short section is cut out of the respective angle bars and secured to the respective plates 28 as shown in Figures 6 and 7. By this arrangement, the parts of the angle bars connected to the plates 28 act as means whereby workmen may readily slide the plates 28 back and forth while the sections of angle bars on these plates will be properly aligned when the plates 28 are in the position shown in Figure 8. The lever 29 as shown in Figure 4, may be of any desired construction and is provided preferably with a handle 33 merging into a cam 34 which has a bifurcated end 35 adapted to receive the end of axle 21 when in use. Preferably when the cover is moved to its correct position as shown in Figure 8, the workmen will apply a lever 29 to each of the axles simultaneously and then remove the plates 28, after which the cover is lowered from both ends downward to its correct position as shown in Figure 6. If desired, some form of tackle could be substituted for the lever 29, though this is found very desirable for the hatches between decks as it may be readily operated in this restricted space.

In many modern ships, the coaming does not project upwardly as shown in Figure 6 but projects downwardly and presents what is known as a negative coaming as shown in Figures 13 and 14. As shown in Figure 13, the coaming 2' is formed with a shoulder 36 for receiving the packing 4' carried by the channel iron 5. In this form of the invention, the reinforcing bars 9 are arranged beneath the body 8 of the cover instead of on the upper surface. Also there is provided Z bars 37 for accommodating the various stay bolts 12. In this way there will be a minimum obstruction to the space above the deck so that an even surface is presented for the stowage of cargo. As the body 8 of the cover is substantially flush with the deck 1, the axle 21' is offset as shown particularly in Figure 13 while the wheel 19 may function as heretofore described in connection with the member 23 and other parts.

In order to connect two adjacent covers together, a structure is provided as shown in Figure 12 wherein a U-shaped clamp 38 is provided carrying the hook 39 which may be tightened by the nut 40. The hook 39 co-acts with the eye 13 which also acts to hold the Z bar 41 in place, said Z bar pressing against the packing 42 held in place by the bolt 43. This provides a convenient and strong connection between adjacent covers while not presenting an objectionable obstruction. When the covers are not in use, they may be pushed to one side at a convenient place and nested as shown in Figure 15. This is particularly true when the covers 6 and 7, as illustrated in Figures 12 to 14, are used as these covers have the reinforcing members arranged on the lower surfaces and not on the upper surfaces.

What I claim is:

1. The combination of a hatchway, a cover made in sections, reinforcing members connected to each of said sections, a Z bar on the under side of one section formed with a flange projecting beyond one edge thereof and extending under the adjacent edge of a juxtaposed section, a packing strip disposed between said flange and the bottom of the juxtaposed section of the hatch cover, a Z bar connected to the outer surface of said juxtaposed section immediately above said packing strip, and a bolt co-acting with said last mentioned Z bar and the first mentioned section for clamping the first mentioned Z bar against said packing strip.

2. The combination with a hatchway having coamings, of a cover movable transversely of said hatchway, guiding angle bars arranged adjacent said hatchway and rigidly secured to the deck of the ship carrying the hatchway, a plurality of wheels for said cover, and a stationary plate formed with a socket for each of the wheels, said sockets being so positioned that when the cover is moved squarely over the hatchway the wheels will be in said sockets and the cover in engagement with said coams.

3. The combination with a hatchway having coamings and a plurality of openings in the deck near the coamings, of a cover for the hatchway provided with a packing strip for the under surface adapted to rest on the coamings when the cover in is place, a plurality of threaded members for clamping the cover in place, a pair of wheels for each cover, said wheels being proportioned to support the cover above the coamings normally, said wheels being positioned in respect to the cover to fit into said openings in the deck when the cover is in proper position over the coamings whereby the cover may be lowered until it engages the coamings, and a socket member secured to the under surface of the deck covering said openings, said socket member being of sufficient depth to receive the lower part of said wheels without contacting therewith.

4. The combination with a hatchway having coamings, and openings in the deck adjacent the coamings, of a cover for said hatchway provided with wheels, said wheels being positioned in respect to the cover so as to fit into said openings when the cover is resting on the coamings, means forming a socket secured to the under part of said deck for closing said openings, said means being provided with a pair of runways, sliding members mounted in said runways, a plate rigidly secured to said sliding runways, said plate being movable to a position beneath said wheels so as to support the wheels and cover out of contact with said coamings, said plate being movable from beneath said wheels when the cover is to be lowered into engagement with said coamings, and means for firmly locking said cover in engagement with said coamings.

ARTHUR N. McGRAY.